Feb. 22, 1949.                       A. SIMMON                       2,462,339
         PHOTOELECTRIC EXPOSURE TIME AND PAPER SELECTOR FOR
         PHOTOGRAPHIC ENLARGERS HAVING SLIDE RULE TYPE
                        COMPUTERS AND STEPWEDGES
Filed July 11, 1946                                    5 Sheets-Sheet 1

Alfred Simmon
  Inventor.
BY Walter E. Wollheim
       ATTORNEY.

Feb. 22, 1949.  A. SIMMON  2,462,339
PHOTOELECTRIC EXPOSURE TIME AND PAPER SELECTOR FOR
PHOTOGRAPHIC ENLARGERS HAVING SLIDE RULE TYPE
COMPUTERS AND STEPWEDGES
Filed July 11, 1946  5 Sheets-Sheet 2

Alfred Simmon
INVENTOR.
BY Walter E. Wallheim
ATTORNEY.

Feb. 22, 1949.  A. SIMMON  2,462,339
PHOTOELECTRIC EXPOSURE TIME AND PAPER SELECTOR FOR
PHOTOGRAPHIC ENLARGERS HAVING SLIDE RULE TYPE
COMPUTERS AND STEPWEDGES
Filed July 11, 1946  5 Sheets-Sheet 3

Alfred Simmon
INVENTOR.

BY Walter E. Wallheim
ATTORNEY.

Patented Feb. 22, 1949

2,462,339

UNITED STATES PATENT OFFICE 2,462,339

PHOTOELECTRIC EXPOSURE TIME AND PAPER SELECTOR FOR PHOTOGRAPHIC ENLARGERS HAVING SLIDE RULE TYPE COMPUTERS AND STEPWEDGES

Alfred Simmon, Jackson Heights, N. Y., assignor to Simmon Brothers, Inc., Long Island City, N. Y., a corporation of New York Application July 11, 1946, Serial No. 682,724

9 Claims. (Cl. 95—10)

The object of this invention is an instrument which facilitates the selection of the proper exposure time and of the proper grade of paper for making photographic enlargements. The instrument comprises three main parts, a light measuring unit, a computing unit and a stepwedge unit, and its method of operation is briefly as follows:

The intensity of the light impinging upon a selected point of the enlarged image as projected by a conventional enlarger on the usual easel is measured by means of the light measuring unit, usually measured in foot candles. This light intensity value is fed into the computing unit and here converted for a given exposure time into light intensity-seconds or foot-candle seconds. The stepwedge unit contains sample stepwedge prints made on light sensitive paper of various contrast grades, and means are provided enabling the operator to see which step of these prints has been exposed to substantially the same number of foot-candle-seconds as obtained by said computing device. In this manner, the operator is enabled by this instrument either to predict the density to be expected for a selected image point from a given exposure time or, by selecting judiciously the desired density for a salient point of the image, the operator may determine the necessary exposure time and paper grade, the salient points being usually, but not always, the darkest and the brightest points of the image appearing on the easel.

A preferred embodiment of this invention is illustrated in the attached drawings, in which

Fig. 5 is a cross-sectional view along the plane of line 5—5 in Fig. 4;

Fig. 6 is an electric wiring diagram;

Fig. 7 is the resistance element of a logarithmically attenuated rheostat which forms part of this circuit;

Fig. 8 is a motor driven rotating switch which forms part of the circuit shown in Fig. 6;

Fig. 9 is a plan view of the photoelectric cell with its housing, its cover having been removed; and Fig. 10 is a cross-sectional view along the plane of line 10—10 in Fig. 9.

Like characters of reference denote similar parts throughout the several views and the following specification.

Figures 1, 2:
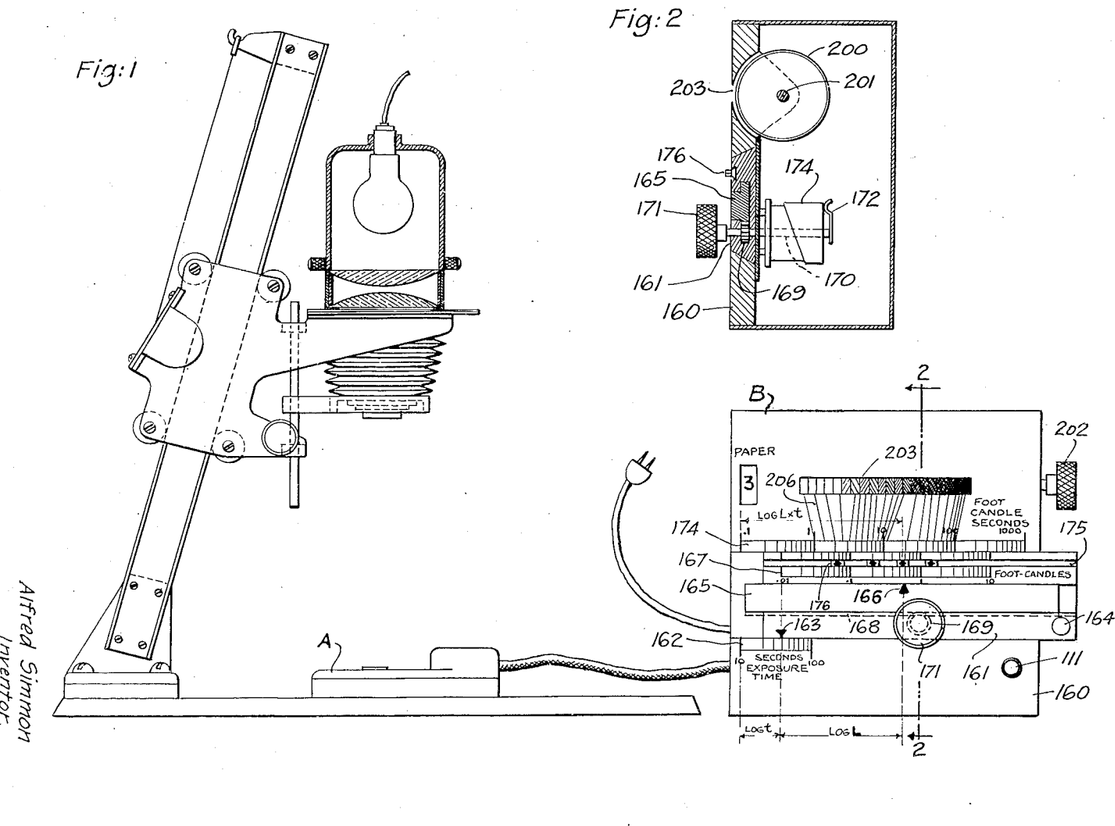
Fig. 1 shows a typical enlarger in connection with the instrument covered by this invention.
Fig. 2 is a cross-sectional view of the instrument along the plane of line 2—2 of Fig. 1.

The general appearance and method of application of the instrument can be seen in Fig. 1. A typical enlarger is shown which consists in the usual manner of a baseplate, a substantially vertical supporting structure, and a projector mounted thereon, part of this projector showing the lamp, and the condensors being illustrated in cross-section. The detailed design of this enlarger forms no part of this invention and is, therefore, not being described here. The instrument which forms the object of this invention consists physically of two parts, part A and part B. Part A is a housing which contains a photoelectric cell and part B contains all other parts. It comprises a cabinet of any convenient shape, usually a rectangular box. This cabinet contains all other elements including the electrical components such as rectifying tubes, transformers, capacitors, etc. The exact disposition of these parts within said cabinet is of no particular consequence and has, therefore, not been shown in detail. The function of these parts, however, has been fully explained by the circuit diagram shown in Fig. 6. The photoelectric cell with its housing is adapted to be placed on any point of the easel so that the light intensity impinging upon selected points thereon can be measured.

As has been explained above, this instrument contains basically three parts, i. e., light measuring unit, computing unit and a stepwedge unit, and these three component parts will now be described in this sequence.

Light measuring unit

In its preferred embodiment the light measuring unit comprises a photoelectric cell mounted in a suitable housing which can be placed on the easel so that individual image elements thereupon can be analyzed. This photoelectric cell is associated with an electric circuit which enables the operator to measure the magnitude of the current passing the cell. This circuit may be of any desired type, but in its preferred embodiment two part circuits are provided, the output voltage of the first part circuit being directly controlled by said photoelectric cell, and the output voltage of the second circuit being controlled by a manually operated rheostat. A separate balance indicator shows when the difference between the two output voltages assumes a predetermined value.

Photoelectric cell

Basically the photoelectric cell may be of any of the several types well known in the art, but in practice, I prefer to use a so-called electron multiplier tube since in this manner no separate and complex amplifier will be necessary. An electron multiplier tube comprises an evacuated glass vessel with a plurality of electrodes. The first of these electrodes has a coating of a suitable metal, usually potassium or caesium and has, in a manner well known in the art, the property to emit electrons upon exposure to light. A supply circuit which will be explained in detail later imposes a suitable voltage between two subsequent electrodes, each electrode being positive with respect to the preceding one. The relatively few electrons emitted by the first photo emissive electrode are thereby attracted by the second electrode, and striking this second electrode, release a certain number of secondary electrons. This number of secondary electrons is larger than the number of the primary electrons causing their release, and the property of the tube to "multiply" electrons is based on this fact. These secondary electrons are made to impinge upon the third electrode releasing there a still larger number of "tertiary" electrons and the process is repeated at each subsequent stage until a very high amplification factor is obtained in this manner. Referring to the circuit diagram, Fig. 6, the glass vessel of the multiplier tube is designated 20. 21 is the first photo emissive electrode and 22 to 30 are subsequent electrodes.

Supply circuit for multiplier tube

The voltage required between two subsequent electrodes is of the general order of 100 volts and, since a typical tube has ten electrodes, a voltage of approximately 1,000 volts together with a suitable voltage divider with ten steps, would be necessary. Since a device of this character is expensive and has also several other disadvantages, I am making use of a supply circuit which has already been fully disclosed in a copending patent application Serial #585,350, filed by Louis L. Weisglass, and assigned to Simmon Brothers, Inc., the assignee of this application, now Patent No. 2,430,265. This supply circuit uses a battery of condensers or capacitors 31 to 39, inclusive. The intermediate points of this battery are connected, as shown, to subsequent electrodes of the multiplier tube. These intermediate points are also connected to switch buttons 40 to 49 which are mounted in a circle on a plate made from some suitable insulating material. This arrangement can also be seen in Fig. 8. This assembly of switch buttons is mounted opposite to two rotating contacts 50 and 51 which are mounted on a shaft 52 made again from insulated material. Also mounted on this shaft are two slip rings 53 and 54 which are connected to the two rotating contacts 51 and 50, respectively. These slip rings, in turn, are in current conducting relationship with two brushes 55 and 56, and the entire assembly comprising the shaft 52, the slip rings 53 and 54, and the contacts 51 and 50, is kept rotating by means of two gears 57 and 58 and a small motor 59. The two brushes 53 and 54 are, in turn, connected to a suitable source of direct current. This source must supply a direct current of a voltage substantially equal to the voltage required between subsequent electrodes of the multiplier tube, but may otherwise be of any convenient design, for example, it may be a battery. As a preferred example, I show a transformer with a primary coil 60, an iron core 61 and a secondary coil 62. The secondary coil 62 delivers a certain A. C. voltage which passes the rectifying tube 63 and charges the condenser 64. Since it is desirable to have the output voltage of this condenser rendered constant and independent of accidental line voltage fluctuations, I provide a gas filled regulator tube 65 in series with a resistor 66. Parallel to the regulator tube 65 is a potentiometer 67 including a sliding contact 68 by means of which the voltage impressed upon the brushes 53 and 54 can be adjusted. For a more complete description of this method to energize vacuum tubes of the multiplier type, I wish to refer to the before mentioned copending application Serial #585,350.

Measuring circuit

It is necessary to provide means to indicate the magnitude of the electric current passing the photoelectric tube in response to the received illumination. These indicating means may comprise, for example, a sensitive microameter but, in practice, I prefer to use the following system: Two part circuits are provided, the output voltage of the first part circuit being controlled by the photoelectric cell, and the output circuit of the second circuit being manually controlled by suitable means, for example, a rheostat. The output voltages of both circuits are made to oppose each other and indicating means are provided to indicate when the difference between the two output voltages assumes a predetermined value.

Photoelectric part circuit

Most of the salient parts of this part circuit have already been described and it is merely necessary to mention at this point that the output of the multiplier tube is impressed on a resistance 70. The voltage between points 71 and 72 is in direct proportion to the illumination which impinges upon the electrode 21 of the multiplier tube.

Manually controlled part circuit

This part circuit is shown on the right side of Fig. 6. It consists of a source of D. C. which is impressed upon the three resistors 73, 74 and 75 which are connected in series. Resistors 73 and 75 are fixed but resistor 74 forms part of a potentiometer which will be described in detail below. The source of direct current which passes these three resistors may again be a battery or any other suitable source, and again merely as a preferred means I use a transformer, a rectifying tube and a condenser. The transformer may be a separate transformer or, more conveniently, a secondary coil 80 may be wound on the same iron core 61 which is already being used for the transformer of the photoelectric part circuit. The alternating current delivered by this secondary is passing a rectifying tube 81 and charging a condenser 82. The terminals of this condenser are connected to a second gas filled regulator tube 83 which is in series with a fixed resistance 84. The three aforementioned resistors 73, 74 and 75 constitute the load circuit, and are connected in parallel to the regulator tube 83. The voltage impressed upon these three resistors is thereby rendered constant and independent of accidental line voltage fluctuations.

I have not shown any current supply for the filaments of the two rectifying tubes 63 and 81 as well as for the thyratron 110 to be mentioned later. Means to supply these filaments with current are well known in the art, and, for example, separate transformers may be used or additional turns of wire may be wound on the iron core 61 on the transformer that supplies the plate current for the two circuits.

Rheostat

The manually adjustable rheostat which controls the last named circuit is one of the most essential parts of this instrument and will, therefore, be described in detail. A cross-sectional view is shown in Fig. 5.

The rheostat comprises a cylindrical body 91 made from a suitable insulating material. This cylindrical body 91 serves as a support for a resistance element 74. This resistance element comprises a relatively large number of convolutions of thin resistance wire wound on a flexible strip made from sheet fibre or other suitable insulating material. This insulating strip is held flat while the wire is wound thereupon, but is afterwards bent into a cylindrical shape and attached to a cylindrical support 91. It is desirable to shape this resistance element so that the rheostat has a logarithmic attenuation. For this reason, the supporting strip is given a trapezoidal shape as shown in Fig. 7. This shape, of course, will cause the rheostat to have a lower resistance value per unit length at one end than at the other. This, by itself, will not as yet give a true logarithmic attenuation and the wire is, therefore, wound on this trapezoidal element with a variable pitch, the convolutions being relatively close together on the high side of the supporting strip and relatively far apart on the low side. By varying the pitch of the wire in a suitable manner, a very satisfactory approximation of a logarithmic attenuation can be obtained. A sliding contact is formed by a leaf spring 93 which is made from phospher bronze or berylium copper or the like. This leaf spring is supported by a shaft 95, but insulated therefrom, and one end makes contact with resistance element 74 and the other one slides on a ring 99 made from brass or the like. This ring serves as a connecting element to the other parts of the circuit.

Balance indicator

The purpose of the balance indicator is to indicate when the difference between the two output voltages of the photoelectric part circuit and of the manually controlled part circuit, respectively, assumes a predetermined value. This can, for example, be done by a sensitive galvanometer. In this case it would be most logical to adjust the two voltages until they are equal to each other or until their difference becomes zero. As a preferred device I use a gas filled thyratron tube 110 in series with a load device which indicates when said thyratron becomes current conducting. This load device may be of any suitable type and again a galvanometer may very well be used. As a preferred device, I use a small glow lamp 111 filled with neon or some other suitable gas. A current limiting resistor 112 is connected in series with this lamp. As can be seen in Fig. 6, the grid of the thyratron is connected to point 72 and the grid voltage of the thyratron with respect to its filament depends, therefore, upon the voltage which is impressed upon resistor 75, that portion of the resistor 74 up to the point where it makes contact with the sliding contacts 93 which is in the circuit 94, and resistance 70. The voltage across resistance 75 and part of resistance 74 represents the output voltage of the manually controlled part circuit. The voltage impressed upon resistance 70 represents the output voltage of the photoelectric part circuit. By tracing the circuit of Fig. 6 it can be seen that both voltages are of opposite polarity, i. e., oppose each other and, therefore, the voltage between the filament and grid of the thyratron represents the difference between the output voltages of the manually controlled and of the photoelectrically controlled part circuit, respectively. A thyratron usually becomes current conducting as soon as the voltage of the grid with respect to the filament becomes higher than approximately —2 volts and this is the voltage which, in the appended claims has been called "the predetermined value of the difference between the two output voltages of the two part circuits." In other words, if the grid is more negative than —2 volts with respect to the filament, no current will flow and the glow lamp 111 will remain dark. As soon as the negative bias of the grid with respect to the filament is less than —2 volts, current will begin to flow and the glow lamp 111 will light up. There is usually a small borderline region when the glow lamp will flicker at more or less intervals, and the critical setting of the potentiometer is made relatively easy thereby. The plate circuit of the thyratron may be connected to any convenient source of alternating current and merely as a convenience I use the voltage delivered by the secondary coil 80 of the transformer described above. As can be seen, one end of the coil 80 is connected to the filament of the thyratron, the anode of the thyratron is connected to one side of the glow lamp 111, the other side of the glow lamp is connected to the current limiting resistance 112 which, in turn, is connected to the other side of the secondary coil 80.

Means to extend the range of the measuring circuit

One revolution of the sliding contact 93 of the rheostat will correspond to a variation in the measured intensity of the light impinging upon the photoelectric cell approximately in the ratio 1:10. This is not enough since the light intensity depends upon many factors such as the character of the negative, the magnification ratio, the setting of the iris diaphragm of the lens, and others, and it is, therefore, necessary to provide means to extend the range of the light intensity which may be measured. In order to accommodate a sufficiently wide range, I am, therefore, using an expedient which has already been disclosed in a copending patent application Serial #633,475, filed by Louis L. Weisglass, and assigned to Simmon Brothers, Inc., the assignee of this application, now matured into Patent No. 2,411,486 of November 6, 1946.

This method consists essentially of permitting the sliding contact 93 to make several revolutions, usually 3, and changing the light admittance of the photoelectric cell after each revolution. The light admittance of the photoelectric cell is most conveniently changed by interposing suitable diaphragms with smaller or larger apertures. If one revolution of the rheostat contact 93 accommodates a range of light intensity in the proportion of 1:10 and if one provides three diaphragms with apertures varying in the proportion of 1:10:100, light intensities in the proportion of 1:1000 can be accommodated. The arrangement is shown schematically in Fig. 6 and also in Figs. 9 and 10.

Referring to Figs. 9 and 10, the photoelectric cell 20 is mounted in the conventional tube socket 120 which, in turn, is attached to a plate 121. This plate is mounted in a housing 122, the upper part of which is closed by a cover 123. Cover 123 has been omitted in Fig. 9. Plate 121 supports directly above the photoelectric cell a thin plate 124 with a relatively large aperture 125. Between this aperture and the photoelectric cell there is a small disc of diffusing glass 126. It is the purpose of this diffusing glass to prevent irregularities due to the fact that without it the light impinging upon the light sensitive electrode 21 may hit more or less sensitive spots thereon. By interposing this diffusing glass the entire area of this light sensitive electrode will be evenly illuminated.

Mounted on top of plate 21 are two electromagnetically controlled diaphragms 127 and 128. Diaphragm 128 has a medium sized aperture 129 which is smaller than the aforementioned large aperture 125. In the numerical example in which one revolution of the rheostat accommodates a light range 1:10, the area of aperture 129 would be 1/10 of the area of aperture 125. The diaphragm 127 has an aperture 130 which is still smaller and which in the same example would have 1/10 of the area of aperture 129 or 1/100 of the area of aperture 125. Each of these diaphragms has the shape shown in Fig. 9 and the two diaphragms are arranged in slightly different planes as can be seen in Fig. 10. Each of these plates has an upturned lug 131 and 132, respectively, and to each of these upturned lugs there is attached an iron core 133 and 134. Two electromagnetic coils 135 and 136 are provided which, when energized, attract one of these iron cores, respectively. As shown in the drawings, coil 135 is represented as being energized and has thereby attracted iron core 133 which, in turn, places diaphragm 128 in a position in which its aperture 129 is directly above the photo sensitive electrode 21 of the photoelectric cell. Each of these aperture plates has a slot 137 and 138, respectively, and each of these slots engages two guide pins which can be seen in Fig. 9. Return springs 139 and 140 are provided which return the diaphragm blades to their original positions as soon as the corresponding coil is deenergized.

Which of these coils, if any, is energized depends upon the position of a rotating switch which is shown on the left side of Fig. 6. It comprises a rotating spring 145 made from phosphor bronze or berylium copper or the like, which makes contact with a circular ring 146 at one end and with a similar ring at the other end. The second mentioned ring, however, is split into three segmental parts 147, 148 and 149. Ring segment 147 is connected to coil 136 and ring segment 148 is connected to coil 135. The circular ring 146 is connected to one end of the line, and the two other ends of both coils 135 and 136 are connected to the other end of the line.

A preferred mechanical construction of this rotating switch can best be seen in Fig. 5 which shows a cross-section through the rheostat. The sliding contact 93 which was described above is rotated by and attached to shaft 95. Also fastened to shaft 95 is a small gear 150 which meshes with a larger gear 151. Another small gear 152 is attached to the larger gear 151, and both rotate as a unit on a stationary shaft 153. This stationary shaft is fastened to the same support to which the insulated body 91 is fastened which carries the aforementioned resistor 74. This support forms part of the computing unit to be described later. The small gear 152, in turn, is in mesh with a large gear 154 which is fastened to a cylindrical sleeve 155 which is rotatably supported by shaft 95 of the rheostat. A pointer 156 is carried by the front end of the cylindrical sleeve 155, and a knob or handwheel 157 is fastened to the front end of shaft 95. Pointer 156 acts on a scale which is calibrated in foot-candles or equivalent units, and which will be described later.

The result of this arrangement is that the operator may turn handwheel 157 and therewith contact 93 several times, three times, while gear 154 with the associated cylindrical sleeve 155 and pointer 156 moves much slower, depending upon the ratio of the various gears. As shown, gear 151 has twice the diameter of gear 150 and gear 154 has twice the diameter of gear 152 so that the cylindrical sleeve of gear 155 is backgeared in the proportion 1:4. Therefore, in the same time in which the operator turns the knob 157, and therewith contact 93 three times, the part 155 and the pointer 156 make three-quarters of one revolution.

Supported by sleeve 155, but insulated therefrom, is contact spring 145, one end of which is in contact with the ring 146 and the other end of which makes contact with one of the three segments 147, 148 and 149, respectively. By this arrangement, one accomplishes that after each full revolution of spring 93 contact 145 moves from one segment to the next one, thereby changing the electrical connections of the diaphragm blades and the electromagnetic coils. In other words, the operator, for example, performs first one full revolution with both coils deenergized, i. e., spring 145 in contact with the nonconnected segment 149. In this position both diaphragm blades are moved by their respective return springs to the left, Fig. 9, and the light admittance of the cell is controlled by the size of the diaphragm opening 125. After a full revolution of spring 93, contact 145 has made one-quarter of a revolution and will come in contact with segment 148 thereby energizing coil 135. This, in turn, attracts the diaphragm 128 which is now shifted to the right so that its medium sized aperture 129 is above the photoelectric cell thereby limiting its light admittance. This is the position shown in Figs. 6 and 9. After another full revolution of contact 93 the rotating contact 145 has moved another quarter of a revolution and will move from contact with segment 148 into contact with segment 147, thereby deenergizing coil 135 and energizing coil 136. Coil 135 will now release blade 128 which will return towards the left to its original position, and coil 136 will attract blade 137 which will now move to the right, placing the smallest diaphragm opening 130 above the photoelectric cell. The general principle of this arrangement has been fully disclosed in the beforementioned copending application Serial #633,475, and I wish to refer to this application for a fuller description of the principles involved and the specific means employed to this end.

*Computing unit*

The light intensity value of a selected point of the easel is measured by the light measuring unit described above and is then fed into the computing unit. In this computing unit this light intensity value is converted, for a given or chosen exposure time, into light intensity-seconds; light intensities are commonly expressed in foot-candles and consequently light intensity-seconds are expressed in foot-candle-seconds.

The simplest computing mechanism applicable to this purpose is the well known slide rule and such a mechanism has been shown in Figs. 1 and 2.

A slide rule like computing mechanism comprises two principal parts which are movable relative to each other, or, in other words, one of these parts is stationary and the other one is movable. The stationary part 160, Fig. 1, forms at the same time the housing which contains all other component parts of this device including the electrical components of the light measuring unit described above, with the exception of the photoelectric cell itself. The second principal part 161 is mounted slidably in a suitably shaped groove of part 160, which also carries a scale 162 which is divided in exposure time values which, of course, are logarithmically spaced. Part 161 carries a corresponding mark 163 which cooperates with this scale to indicate exposure times. A knob or handle 164 is attached to slide 161 in order to facilitate its movement.

A movable element 165 is, in turn, mounted slidably on part 161. This part carries a mark 166 which cooperates with a scale 167 which is affixed to part 161. This scale 167 indicates footcandle values which again are logarithmically spaced.

While the relative position of mark 163 with respect to scale 162, or the relative position of part 161 relative to part 160, depends upon the choice of the exposure time, the relative position of mark 166 with respect to scale 167, or the relative position of part 165 with respect to part 161, depends upon the number of foot-candles which impinge upon the photoelectric cell, and it is, therefore, necessary to provide an operative connection between the light measuring unit and the computing unit or, more specifically, between the position of the balancing rheostat which was described above, and the foot-candle indicator formed by mark 166 and scale 167. For this purpose, a rack 168, shown in Fig. 1 in dotted lines, is affixed to part 165, and this rack is in mesh with a spur gear 169 which is fastened to a shaft 170. This shaft is turned by a knob 171 and supports a contact spring 172 which slides on the resistance element 174 of the rheostat. It will be noted that the rheostat is shown more or less schematically in Fig. 2. For a more detailed view, reference is made to Fig. 5.

By means of this mechanical connection between the rheostat and slide 165, the measured number of foot-candles is directly indicated by mark 166 on scale 167.

With reference to Fig. 1, it can be seen that the distance from the left end of scale 162 to mark 163 is equivalent to Log $t$ and that the distance from the left end of scale 167 to mark 166 corresponds to Log L. Consequently, the horizontal distance as measured from the left end of scale 162 to mark 166 corresponds to the logarithmic value of the number of foot-candle-seconds, Log L×$t$. A third scale 174 calibrated in foot-candle-seconds is, therefore, provided on the stationary part 160, and this scale is in juxta-position to the aforementioned scale 167. The whole arrangement can clearly be seen in Fig. 1 and is really nothing more than a modified slide rule mechanism.

As can be seen in Figs. 1 and 2, part 161 is equipped with a small groove 175 for a number of slidable tabs 176. The purpose of this groove with these slidable tabs is to provide convenient means for the operator to remember the light intensity which he has measured for various selected points on the easel. These selected points will usually include the darkest and the brightest points, but it may also be desirable to measure the density of other points which appear to be particularly important to the appearance of the finished print. During the operation of the device, the operator measures the intensity of these various points by turning knob 171 until the neon lamp 111, as explained above, is on the border line of extinction, in which case the position of mark 166 on scale 167 indicates the light intensity. The operator then shifts one of the slidable tabs 176 in a position opposite mark 166 where it remains for the rest of the operation for ready reference.

The computing device as shown in Figs. 1 and 2 is perfectly practical, but has the disadvantage that its horizontal dimension becomes quite large. As can be seen, the foot-candles and the foot-candle-second scales have to run through several decades. A slightly more practical and compact arrangement which, however, employs exactly the same principles has, therefore, been shown in Figs. 4 and 5.

In this preferred embodiment of the invention the straight part 161 has been replaced by a rotatable disc 180, and the movable element 165 with its mark 166 has been replaced by the pointer 156 which was already mentioned above.

Again, the computing mechanism has two principal parts, a stationary part 181 and the rotatable circular disc 180. The stationary part 181 carries a scale 182 calibrated in logarithmically spaced exposure time values, and the disc 180 carries a mark 183 which acts on said scales. The disc 180 also carries a scale 184 which is calibrated in logarithmically spaced light intensity values customarily expressed in foot-candles. The aforementioned pointer 156 acts on that scale. The pointer 156 is in operative engagement with the sliding contact 93 of the rheostat and I wish to refer to the chapter on said rheostat and on "means to extend the range of the measuring circuit" where this arrangement has already been fully described.

The disc 180 carries again a groove 185 which, in this instance, of course, is circularly shaped and in which again a number of movable tabs 186 may be adjusted by the operator in order to remember the light intensity of various selected points on the easel as measured by the light measuring unit. The foot-candle scale affixed to the rotatable part 180 is in juxta-position to a stationary scale 187 affixed to part 181 and calibrated in logarithmically spaced values of foot-candle-seconds.

Figure 4:
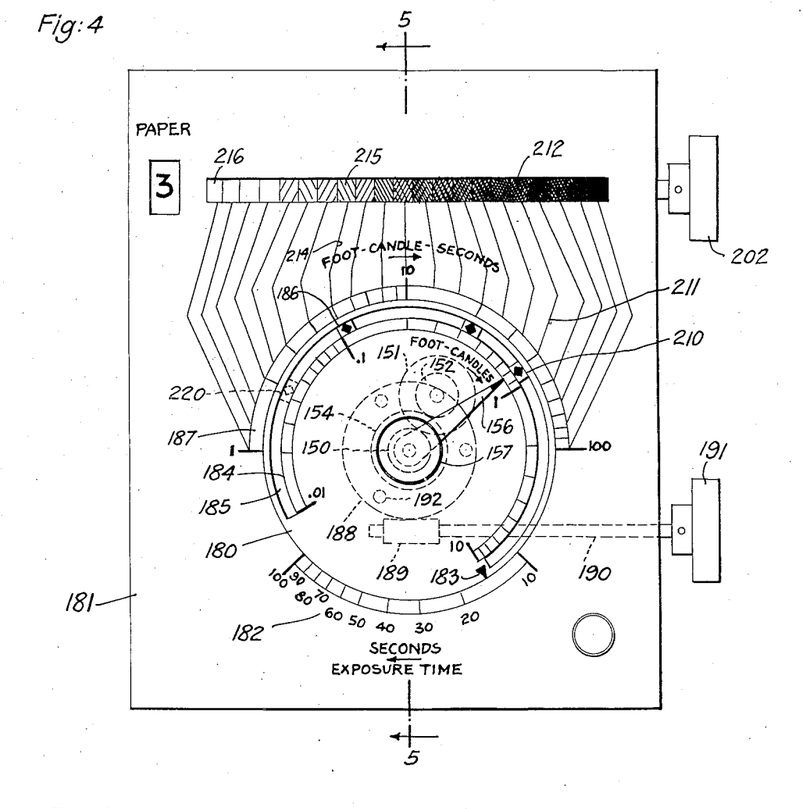
Fig. 4 shows a somewhat modified design of the exposure time and paper selector.

In order to facilitate the rotation of disc 180 a worm gear 188 is fastened to disc 180. This worm gear is actuated by a worm 189 which is fastened to a shaft 190. This shaft may be turned by means of a handwheel 191 which protrudes from the right side of the unit as shown in Fig. 4. The worm gear 188 carries, in turn, three studs 192, the purpose of which is to support the aforementioned body 91 of the rheostat.

*Stepwedge unit*

The purpose of this unit is to enable the operator to predict the density which he may expect for a selected point on the easel from a given grade of paper and for a given exposure time or, which amounts to the same thing, the operator may select with the help of this device, the proper grade of paper and a suitable exposure time in order to obtain a desired density for a selected point of the image. For this means, a support is provided on which a plurality of stepwedge prints can be mounted. These stepwedge prints represent light sensitive papers of various grades of contrast and the support can be moved in such a manner that one of these prints is placed in a position in which it can be conveniently viewed by the operator. The device is equipped with means to indicate the grade of paper which is presented to the operator at any given instance and to indicate also the number of foot-candle-seconds to which each individual step of said stepwedge prints was exposed. In this manner it becomes possible to relate the number of foot-candle-seconds, as obtained by the computing unit described above, to the density of a selected step of one of the stepwedge prints which was exposed to substantially the same number of foot-candle-seconds and thereby predict densities which may be expected under certain conditions, i. e., as determined by the light intensity impinging upon a certain point of the easel, a given exposure time, and a given or selected grade of sensitized paper.

Figure 3:
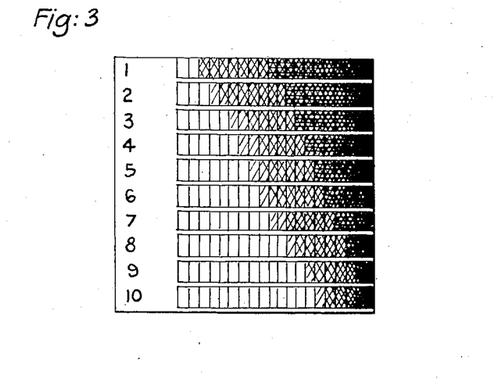
Fig. 3 shows a plurality of stepwedges used in the stepwedge unit of the instrument.

A preferred embodiment of this device can be seen in Figs. 1 and 2, and 4 and 5, respectively. A typical example of a plurality of stepwedge prints is shown in Fig. 3.

The supporting structure comprises a cylinder 200 which is supported by a shaft 201. This shaft with this cylinder can be rotated by the operator by means of handwheel 202. The housing, 160 in case of Figs. 1 and 2 and 181 in case of Figs. 4 and 5, has an elongated slot 203 through which part of the cylindrical support 200 becomes visible.

Mounted on the cylindrical circumference of part 200 is a plurality of stepwedge prints. These stepwedge prints are obtained by inserting a stepwedge negative into the enlarger and exposing a test strip of sensitive paper on the easel to the suitable enlarged image of the stepwedge negative as projected by the enlarger on th easel. This is done with a number of paper strips, each strip representing a different contrast grade of the chosen paper brand. The number of prints assembled in this manner depends upon how many different contrast grades of the chosen paper brand are commercially available. Most paper brands are commercially available in three or usually four contrast grades, in which case the plurality of stepwedge prints as mentioned in the appended claims would comprise three or four prints. There is also commercially available a paper with a variable contrast. This paper is capable of delivering prints of any grade of contrast from extremely "soft" to extremely "hard" prints, depending upon the color of the light to which it is being exposed, yellow light delivering very "soft" and blue light delivering very "hard" prints, intermediate grades being obtainable by suitable color mixture. In the case of a variable contrast paper of this type, the plurality of stepwedge prints may, of course, comprise an infinite or a very large number of prints, and, for example, I have shown in Fig. 3, ten prints assumed to be made on paper of this type. Print No. 1 represents the result obtained with 100% yellow, 0% blue, and print No. 10 a print made with 100% blue, 0% yellow, light.

These prints are mounted on the circular circumference of the support 200, and one of these prints is visible to the operator through slot 203. An additional slot 204 is provided by means of which an identifying mark or number becomes visible indicating the grade of paper which happens to be in view.

In order to give this exhibition of stepwedge prints a numerical meaning, it is necessary to indicate the number of foot-candle-seconds to which each individual step has been exposed. Theoretically, it would be simplest if a properly calibrated stepwedge print could be produced in which the density and spacing of the various steps would correspond exactly, for example, to the scale values of scale 174 in Fig. 1. In practice, it will be found almost impossible to accomplish this, and it is, therefore, preferable to use the means shown in Fig. 1 and Fig. 4, respectively. These means to indicate the number of foot-candle-seconds to which each individual step of the exhibited stepwedge print was exposed comprises a system of lines 206 by which each individual step is being connected to that point of the foot-candle-second scale, 174 in Fig. 2 and 187 in Fig. 4, to which it was exposed. Referring to Fig. 4, for example, it will be seen that the extreme left field of the visible stepwedge print was exposed to one foot-candle-second and that the extreme right field was exposed to 100 foot-candle-seconds. The first value is so low that the sensitized paper remains entirely white whereas the second value is so high that the paper becomes entirely black, having been overexposed many times.

Operation

The operation of the device may be divided into three steps, i. e., adjusting the enlarger, measuring the intensity of salient points of the image on the easel, and establishing a satisfactory density pattern by choice of a suitable grade of paper and exposure time.

The adjustment of the enlarger does not depart in any way from conventional practice. A photographic negative, usually supported by a suitable filmholder, is placed on the film stage of the enlarger, the magnification ratio is adjusted to the desired value by moving the projector up and down on its supporting structure, the image is sharply focused on the easel, and if desired, the iris diaphragm of the lens is stopped down.

The operator then places the sub-assembly A, Fig. 1, containing the photoelectric cell on the easel and measures the light intensity of various points. These points include preferably the brightest and darkest point on the easel, but intermediate points which appear important to the composition and final appearance of the picture may also be included. After the photocell is placed on a desired point, knob 157 is rotated until the neon lamp 111 is on the borderline of extinction. In the manner described above, knob 157 actuates the balancing rheostat of one of the part circuits, and the borderline condition of the neon lamp indicates that the two part circuits are in balance or that the difference of the two voltages has assumed a predetermined value. The rotation of knob 157 causes the adjustment of pointer 156. Each time the light intensity value for a selected point has been established in this manner, one of the slidable tabs 136 is shifted manually by the operator into a position opposite point 156. The various tabs will keep these positions for the rest of the operation for ready reference of the measured light intensities. These tabs establish a light intensity pattern for the enlarged projected image of the photographic negative, and such a pattern comprising three tabs can, for example, be seen in Fig. 4.

The third step comprises the conversion of the light intensity pattern, as measured, into a density pattern for the expected print. This is done by manipulating simultaneously or alternately knob 191 and knob 202, thereby changing the exposure time and/or the grade of paper on which the print will be made. After a satisfactory pattern has been established, the exposure time will be indicated by mark 183 on scale 182, and the paper grade will be indicated in window 204. A print can then be made accordingly.

Generally speaking, negatives of moderate density and moderate contrast usually permit establishing a satisfactory density pattern by merely making the point of brightest illumination correspond to the first almost black step of the stepwedge print and by making the point of weakest illumination correspond to the first almost white print of the stepwedge print. For example, the point of brightest illumination in Fig. 4 is point 210 as indicated by one of the tabs which happens to be opposite point 156 at this instance. It is possible to trace from point 210 line 211 to step 212 of the stepwedge print. This point should be just about black enough to give in the finished print the illusion of complete blackness, but it should not be quite as black as, for example, point 213 at the extreme right end of the stepwedge print, because then, small differences in density or texture will no longer be reproduced. In the same manner, tab 186 is related by line 214 to step 215. This step again should be white enough to give the illusion of complete whiteness in the finished print, but it should not be quite as white as the point 216 on the extreme left end of the stepwedge print, because there again, small differences in density can no longer be reproduced.

How far the operator will approach complete blackness and complete whiteness with these near black and near white steps depends to a large extent upon his individual judgment and desire, but generally speaking, if the brightest and darkest point of the negative are quite small, it is possible to give them fairly extreme black and white values, respectively, because then, texture is no longer an important consideration. If, however, the picture contains large dark or large white portions, it is desirable to make them light gray or dark gray rather than completely white or black, respectively, because in this manner a much more satisfactory rendition of details and of texture can be secured.

It will be found that a number of photographic negatives will not yield satisfactory prints in this simple manner. This is due to the well known fact that the contrast range of a photographic negative may be as high as 1:500, whereas the contrast range reproduceable by bromide paper will usually not exceed 1:50. If the brightest and darkest point measured by the device is relatively small, they can very often be disregarded and can be, respectively, over or underexposed, without jeopardizing the appearance of the finished print too much. In other words, the white step corresponding to the darkest point on the easel may then be considerably to the left of field 215, and the darkest step corresponding to the brightest point on the easel may be considerably to the right of field 212.

Again, if the darkest and brightest portions of the picture cover a fairly extensive area, respective over or underexposure would produce a very unpleasant and unsatisfactory print, and experienced photographers usually remedy this situation by either holding back certain portions of the print or by giving certain other portions of the print an additional exposure. This is usually done by means of a mask made from a black piece of paper with a suitable hole which is manually moved during the exposure in order to prevent sharp and recognizable borderlines. With an instrument built according to this invention, the operator can predict how much additional exposure he may have to give to certain points, or how long certain points may have to be held back. For example, I have shown in dotted lines an additional tab 220 which indicates that the corresponding point of the print would be entirely underexposed. If we assume that notwithstanding the excess contrast of the negative, the operator wants to have this portion of the print rendered with approximately the same density as that corresponding to tab 186 and step 215, the additional exposure could be measured by the angular distance between tabs 220 and 168. How much this means in seconds can be determined by rotating knob 191, and therewith disc 180, until tab 220 has been shifted to the position formerly occupied by tab 186, and noting the difference in positions of mark 183. The difference of the two exposure times obtained in this manner is the additional exposure time which must be given to the point represented by tab 220. In the same manner, a point which is too bright on the easel and thereby would be rendered entirely black can be held back until its density is reduced to that of, for example, step 212 and the "holding back" time can be established in a similar manner.

It will be understood that many of the features of this device described are merely preferred embodiments and that many of the design features can be freely changed without departing from the spirit of this invention. This has been pointed out in detail in the specifications, particularly referring to the photoelectric cell and its electrical circuit, but also to the slide rule mechanism and the stepwedge unit. In the appended claims, light intensities are understood to mean footcandles or corresponding units in the metric or any other system. Light intensity-seconds are understood to mean foot-candle-seconds or equivalent units expressed in the metric or any other system.

What I claim as new, is:

1. An exposure time and paper selector for photographic enlargers of the type which projects an enlarged image of a photographic negative on an easel, comprising a photocell housing, a main housing, and a connecting cable, said photocell housing containing a photoelectric cell, and adapted to be placed on selected points of said easel, said main housing containing electric circuit elements operatively connected through said connecting cable to said photoelectric cell, including a movable element adapted to be moved in accordance to the magnitude of the current passing said cell, and indicating by its position light intensity values, a slide rule like computing device including two input and one output members, movable relative to each other, the first input member representing time values and adapted to be adjusted by the operator, the second input member representing light intensity values and operatively connected to said aforementioned movable element, and the output member representing the product of the two input values on a first scale calibrated in light intensity × time values, a stepwedge unit comprising a movable carrier supporting a plurality of stepwedge prints of various grades of paper, a second scale calibrated in light intensity × time values, and means to bring the stepwedge print of a selected grade of paper into adjacent relationship to said second scale by moving said carrier, whereby each point of said scale indicates the light × time values received by adjacent portions of said print, and means coordinating corresponding points representing like light intensity × time values on both light intensity × time scales, whereby the output element of said computing device indicates on a point of said first light intensity × time scale the light intensity × time value of an exposure that said selected point on the easel will receive, and whereby the portion of the stepwedge print adjacent to the corresponding point of said second light intensity × time scale shows the density of a selected grade of paper that has received an exposure of the same light intensity × time value.

2. An exposure time and paper selector according to claim 1, said electric circuit elements forming two part circuits, the first part circuit having an output voltage controlled by said photoelectric cell, the second part circuit having an output voltage controlled by a manually controlled rheostat, said circuits also including means to make said output voltages oppose each other, and means to indicate when the difference between said two output voltages, as a consequence of adjustment of said rheostat by the operator, assumes a predetermined value.

3. An exposure time and paper selector according to claim 1, said electric circuit elements forming two part circuits, the first part circuit having an output voltage controlled by said photoelectric cell, the second part circuit having an output voltage controlled by a manually controlled logarithmically attenuated rheostat, said circuits also including means to make said output voltages oppose each other, and means to indicate when the difference between said two output voltages, as a consequence of adjustment of said rheostat by the operator, assumes a predetermined value.

4. An exposure time and paper selector according to claim 1, said electric circuit elements forming two part circuits, the first part circuit having an output voltage controlled by said photoelectric cell, the second part circuit having an output voltage controlled by a manually controlled rheostat, said rheostat comprising a cylindrical resistor and a rotatable contact in current conducting relationship therewith, said contact adapted to perform several revolutions, and means operatively connected to said rotatable contact to change the light admittance of said photoelectric cell after each revolution of said contact, said circuits also including means to make said output voltages oppose each other, and means to indicate when the difference between said two output voltages, as a consequence of adjustment of said rheostat by the operator, assumes a predetermined value.

5. An exposure time and paper selector according to claim 1, said first input member of said computing device supported by and movable relative to said main housing and operatively connected to a mark element and to a scale element calibrated in logarithmically spaced time values, one of the last mentioned elements carried by said first input member and the other one stationarily affixed to said main housing, said second input member of said computing device supported by and movable relative to said first input member, and carrying a mark in operative relationship with a scale calibrated in logarithmically spaced light intensity values, said scale carried by said first input member, the output member of said computing device being stationarily affixed to said main housing and comprising a scale calibrated in logarithmically spaced light intensity × time values, adjacent to said light intensity scale carried by said second input member.

6. An exposure time and paper selector according to claim 1, said main housing having a front wall with a circular aperture, a first stationary scale calibrated in logarithmically spaced time values occupying part of the circumference of said aperture, and a second stationary scale calibrated in logarithmically spaced light intensity × time values occupying another part of said circumference, said electrical circuit elements forming two part circuits, the first part circuit having an output voltage controlled by said photoelectric cell, the second part circuit having an output voltage controlled by a manually controlled rheostat comprising a support, a resistor and a sliding contact, one of the two last named parts being stationary relative to said support and the other being movable, said circuits also including means to make said output voltages oppose each other, and means to indicate when the difference between said two output voltages, as a consequence of adjustment of said rheostat by the operator, assumes a predetermined value, said first input member of said computing device being a circular disc rotatably supported by and fitting into said aperture in the front wall of said main housing, said disc carrying on its circumference a scale calibrated in logarithmically spaced light intensity values, and a mark indicating time values on said aforementioned first stationary time scale, said disc also carrying the support of the said rheostat, said second input member being formed by the movable part of said rheostat, said movable part including a pointer indicating light intensity values on said intensity scale carried by said disc, said output member being formed by said aforementioned second stationary light intensity × time scale, said last named scale being adjacent to said light intensity scale carried by said disc.

7. An exposure time and paper selector according to claim 1, said main housing having a front wall with a circular aperture, a first stationary scale calibrated in logarithmically spaced time values occupying part of the circumference of said aperture, and a second stationary scale calibrated in logarithmically spaced light intensity × time values occupying another part of said circumference, said electrical circuit elements forming two part circuits, the first part circuit having an output voltage controlled by said photoelectric cell, the second part circuit having an output voltage controlled by a manually controlled rheostat, said rheostat comprising a cylindrical stationary resistor and a rotatable contact in current conducting relationship therewith, said contact adapted to perform several revolutions, said circuits also including means operatively connected to said rotatable contact to change the light admittance of said photoelectric cell after each revolution of said contact, means to make said output voltages oppose each other, and means to indicate when the difference between said two output voltages, as a consequence of said rheostat being adjusted by the operator, assumes a predetermined value, said first input member of said computing device being a circular disc supported rotatably by and fitting into said aperture in the front wall of said main housing, said disc carrying on its circumference a scale calibrated in logarithmically spaced light intensity values, and a mark indicating time values on said aforementioned first stationary time scale, said disc also supporting the aforementioned stationary resistor, a rotatable element, including a pointer, forming said second input element, said rotatable element geared to the aforementioned rotatable rheostat contact and adapted to perform less than one full revolution, said pointer indicating light intensity values on said light intensity scale carried by said disc, said means to change the light admittance of said photoelectric cell operatively associated with said rotatable element, whereby the light admittance of said light cell is automatically changed after each revolution of said rheostat contact, and said output member of said computing device being formed by said aforementioned second stationary light intensity $\times$ time scale, said last named scale being adjacent to said light intensity scale carried by said disc.

8. An exposure time and paper selector according to claim 1, said main housing having a front panel with an elongated slot therein, and said movable carrier of said stepwedge prints being a rotatable cylinder, positioned within said main housing and behind said slot, the stepwedge prints being mounted on the surface of said cylinder, whereby selectively one of the stepwedge prints carried by said cylinder may be viewed through said slot, and means operatively connected with said cylinder indicating the grade of paper represented by said stepwedge print.

9. An exposure time and paper selector according to claim 1, said means coordinating corresponding points of the first scale calibrated in light intensity $\times$ time values associated with the output member of said computing device and of the second scale calibrated in light intensity $\times$ time values adjacent to one of said stepwedge prints comprising a system of lines connecting like values on both scales.

ALFRED SIMMON.

REFERENCES CITED

The following references are of record in the file of this patent:

UNITED STATES PATENTS

| Number | Name | Date |
| --- | --- | --- |
| 2,149,250 | Bing | Mar. 7, 1939 |
| 2,185,934 | Tonnies | Jan. 2, 1940 |
| 2,218,236 | Gillon | Oct. 15, 1940 |
| 2,253,231 | Friedell | Aug. 19, 1941 |